United States Patent [19]
Inuyama et al.

[11] Patent Number: 5,917,993
[45] Date of Patent: Jun. 29, 1999

[54] COLOR IMAGE PROCESSING APPARATUS

[75] Inventors: Seiji Inuyama, Kawasaki; Hiroshi Onoue; Masanori Hiraoka, both of Yashiro-machi, all of Japan

[73] Assignee: Fujitsu Limited, Kanagawa, Japan

[21] Appl. No.: 08/678,787

[22] Filed: Jul. 11, 1996

[30] Foreign Application Priority Data

Sep. 20, 1995 [JP] Japan ................................. 7-241085

[51] Int. Cl.$^6$ .............................. B41B 15/00; H04N 1/46; H04N 1/21; G03F 3/08
[52] U.S. Cl. ........................ 395/109; 358/500; 358/523; 358/296
[58] Field of Search ................................ 395/101, 109; 358/500, 501, 515, 518, 530, 534, 523, 296; 345/88, 186, 341

[56] References Cited

U.S. PATENT DOCUMENTS

| | | | |
|---|---|---|---|
| 5,016,191 | 5/1991 | Radochonski | 345/149 |
| 5,046,023 | 9/1991 | Katsura et al. | 345/434 |
| 5,189,523 | 2/1993 | Sugiura et al. | 358/500 |
| 5,542,031 | 7/1996 | Douglass et al. | 395/109 |
| 5,726,779 | 3/1998 | Kadowaki et al. | 358/520 |

*Primary Examiner*—Kim Yen Vu
*Assistant Examiner*—Kimberly A. Williams
*Attorney, Agent, or Firm*—Nikaido, Marmelstein, Murray & Oram LLP

[57] ABSTRACT

Disclosed is a color image processing apparatus, for converting source data into bit map data of each primary color, used for a color image outputting mechanism for expressing secondary colors by superposing a plurality of primary colors. This color image processing apparatus includes bit map memory having a plurality of planes, provided corresponding to the plurality of primary colors, for storing bit map data of the respective primary colors. A write control circuit is formed with a control area, within an address, for designating the plane on which source data should be written. A data converting circuit for writing the source data is provided in the plane of the bit map memory that is designated by data of this address control area. The write plane is designated within the address, and hence the writing on the plurality of planes can be performed at one time, thereby attaining a high-speed writing process.

9 Claims, 11 Drawing Sheets

| REV | CB | MB | YB | COLOR | C-PLANE | M-PLANE | Y-PLANE |
|---|---|---|---|---|---|---|---|
| 0 | 0 | 0 | 0 | — | NOP | NOP | NOP |
| 0 | 0 | 0 | 1 | Y | NOP | NOP | SOURCE WRITE |
| 0 | 0 | 1 | 0 | M | NOP | SOURCE WRITE | NOP |
| 0 | 0 | 1 | 1 | R | NOP | SOURCE WRITE | SOURCE WRITE |
| 0 | 1 | 0 | 0 | C | SOURCE WRITE | NOP | NOP |
| 0 | 1 | 0 | 1 | G | SOURCE WRITE | NOP | SOURCE WRITE |
| 0 | 1 | 1 | 0 | B | SOURCE WRITE | SOURCE WRITE | NOP |
| 0 | 1 | 1 | 1 | K | SOURCE WRITE | SOURCE WRITE | SOURCE WRITE |
| 1 | 0 | 0 | 0 | W | REVERSED SOURCE WRITE | REVERSED SOURCE WRITE | REVERSED SOURCE WRITE |
| 1 | 0 | 0 | 1 | Y | REVERSED SOURCE WRITE | REVERSED SOURCE WRITE | SOURCE WRITE |
| 1 | 0 | 1 | 0 | M | REVERSED SOURCE WRITE | SOURCE WRITE | REVERSED SOURCE WRITE |
| 1 | 0 | 1 | 1 | R | REVERSED SOURCE WRITE | SOURCE WRITE | SOURCE WRITE |
| 1 | 1 | 0 | 0 | C | SOURCE WRITE | REVERSED SOURCE WRITE | REVERSED SOURCE WRITE |
| 1 | 1 | 0 | 1 | G | SOURCE WRITE | REVERSED SOURCE WRITE | SOURCE WRITE |
| 1 | 1 | 1 | 0 | B | SOURCE WRITE | SOURCE WRITE | REVERSED SOURCE WRITE |
| 1 | 1 | 1 | 1 | K | SOURCE WRITE | SOURCE WRITE | SOURCE WRITE |

FIG.4

| R/W (W=1) | BIT SL0 | DATA 0 | REV | CB | MB | YB | CDO | MDO | YDO | C WEO | M WEO | Y WEO |
|---|---|---|---|---|---|---|---|---|---|---|---|---|
| 1 | 0 | X | X | X | X | X | X | X | X | 0 | 0 | 0 |
| 1 | 1 | 0 | 0 | 0 | 0 | 1 | 0 | 0 | 0 | 0 | 0 | 0 |
| 1 | 1 | 0 | 0 | 0 | 1 | 0 | 0 | 0 | 0 | 0 | 0 | 1 |
| 1 | 1 | 0 | 0 | 0 | 1 | 0 | 0 | 0 | 0 | 0 | 1 | 0 |
| 1 | 1 | 0 | 0 | 0 | 1 | 0 | 0 | 0 | 0 | 0 | 1 | 1 |
| 1 | 1 | 0 | 0 | 1 | 0 | 0 | 0 | 0 | 0 | 1 | 0 | 0 |
| 1 | 1 | 0 | 0 | 1 | 1 | 0 | 0 | 0 | 0 | 1 | 1 | 0 |
| 1 | 1 | 0 | 0 | 1 | 1 | 0 | 0 | 0 | 1 | 1 | 1 | 1 |
| 1 | 1 | 0 | 1 | 1 | 0 | 0 | 0 | 1 | 1 | 1 | 1 | 1 |
| 1 | 1 | 0 | 1 | 1 | 0 | 0 | 1 | 1 | 1 | 1 | 1 | 1 |
| 1 | 1 | 0 | 1 | 1 | 0 | 0 | 1 | 1 | 1 | 1 | 1 | 1 |
| 1 | 1 | 0 | 1 | 1 | 0 | 0 | 1 | 1 | 1 | 1 | 1 | 1 |
| 1 | 1 | 0 | 1 | 1 | 0 | 0 | 1 | 1 | 1 | 1 | 1 | 1 |
| 1 | 1 | 0 | 1 | 1 | 0 | 0 | 1 | 1 | 1 | 1 | 1 | 1 |
| 1 | 1 | 1 | 0 | 0 | 0 | 0 | 0 | 0 | 0 | 0 | 0 | 0 |
| 1 | 1 | 1 | 0 | 0 | 0 | 0 | 0 | 0 | 0 | 0 | 0 | 1 |
| 1 | 1 | 1 | 0 | 0 | 0 | 0 | 0 | 0 | 0 | 0 | 1 | 0 |
| 1 | 1 | 1 | 0 | 0 | 0 | 0 | 0 | 0 | 0 | 0 | 1 | 1 |
| 1 | 1 | 1 | 0 | 0 | 0 | 0 | 0 | 0 | 0 | 1 | 0 | 0 |
| 1 | 1 | 1 | 0 | 0 | 0 | 0 | 0 | 0 | 0 | 1 | 0 | 1 |
| 1 | 1 | 1 | 0 | 0 | 0 | 0 | 0 | 0 | 0 | 1 | 1 | 0 |
| 1 | 1 | 1 | 0 | 0 | 0 | 0 | 0 | 0 | 0 | 1 | 1 | 1 |
| 1 | 1 | 1 | 1 | 0 | 0 | 0 | 0 | 0 | 0 | 0 | 0 | 0 |
| 1 | 1 | 1 | 1 | 0 | 0 | 0 | 0 | 0 | 0 | 0 | 0 | 1 |
| 1 | 1 | 1 | 1 | 0 | 0 | 0 | 0 | 0 | 0 | 0 | 1 | 0 |
| 1 | 1 | 1 | 1 | 0 | 0 | 0 | 0 | 0 | 0 | 0 | 1 | 1 |
| 1 | 1 | 1 | 1 | 0 | 0 | 0 | 0 | 0 | 0 | 1 | 0 | 0 |
| 1 | 1 | 1 | 1 | 0 | 0 | 0 | 0 | 0 | 0 | 1 | 0 | 1 |
| 1 | 1 | 1 | 1 | 0 | 0 | 0 | 0 | 0 | 0 | 1 | 1 | 0 |
| 1 | 1 | 1 | 1 | 1 | 0 | 0 | 0 | 0 | 0 | 1 | 1 | 1 |

FIG.6

FIG.11
PRIOR ART
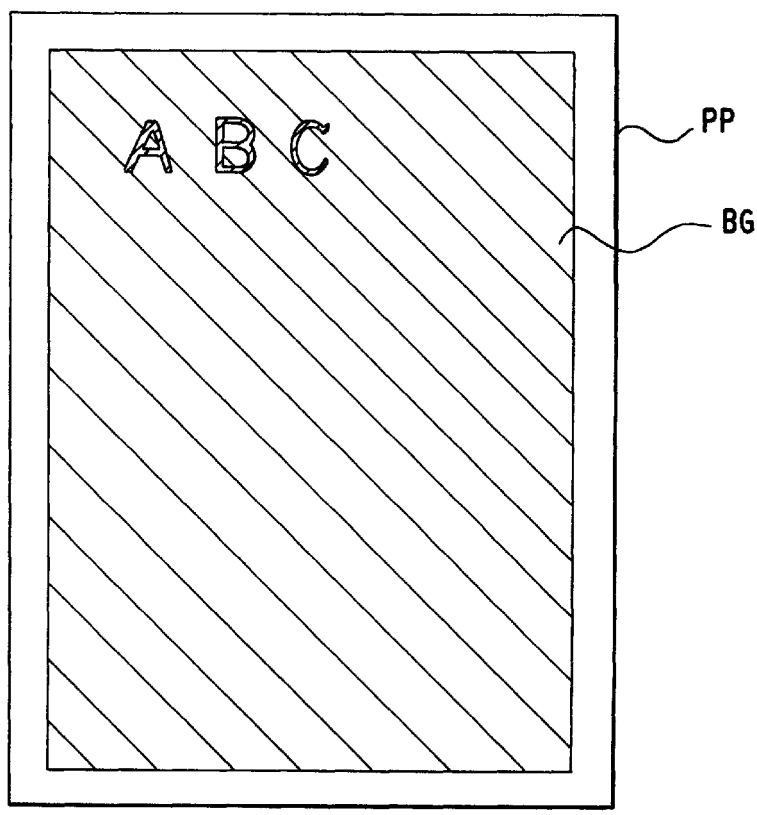
PP
BG
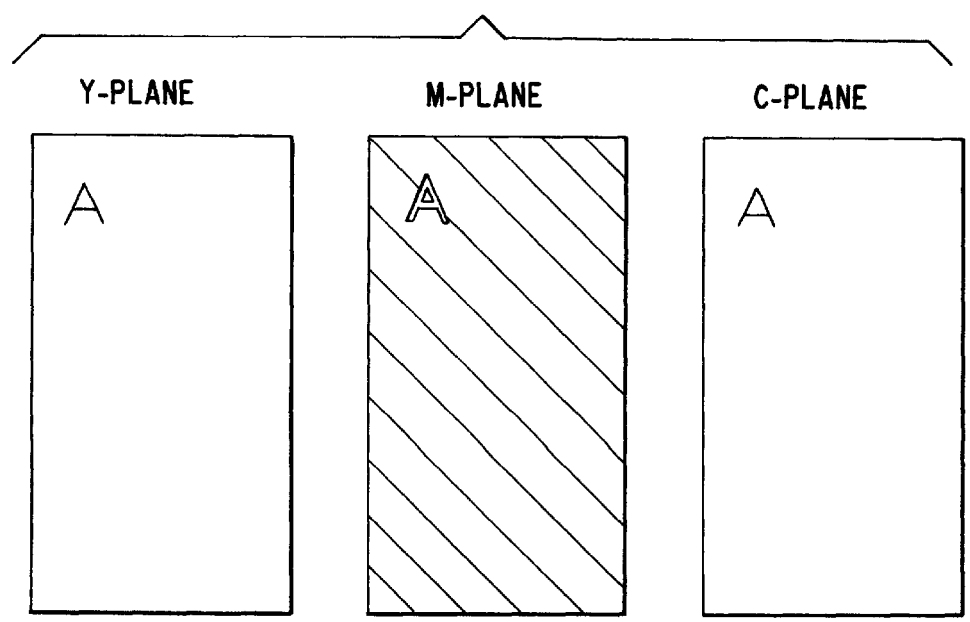
Y-PLANE  M-PLANE  C-PLANE
FIG. 11A  PRIOR ART

COLOR IMAGE PROCESSING APPARATUS

BACKGROUND OF THE INVENTION

1. Field of the Invention

The present invention relates generally to a color image processing apparatus, for processing a color image, employed for a color image outputting mechanism for expressing a secondary color by superposing a plurality of primary colors. The present invention relates more particularly to a color image processing apparatus for writing source data on the plane of each primary color.

2. Description of the Related Art

A color printer and a color display unit have a plurality of primary colors enough for the apparatus to express in monochrome. Further, secondary colors excluding the primary colors can be expressed by combining those primary colors.

For example, the color printer has at least a yellow (Y), magenta (M) and cyan (C) as the monochromatically-expressible primary colors. Then, red (R), green (G) and blue (B), etc. are expressed with combinations of those primary colors.

The above-described color printer incorporates a bit map memory having a memory plane for every primary color. It is therefore desired that data be written on those memory planes at a high speed.

FIGS. 11 and 11A explanatory diagram showing a prior art.

For instance, the color printer has yellow (Y), magenta (M) and cyan (C) as the monochromatically-printable primary colors. Then, the color printer includes a printing mechanism for each of yellow, magenta and cyan.

Further, correspondingly, the bit map memory has a Y-plane for yellow, a M-plane for magenta and a C-plane for cyan.

Then, an item of bit map data of each plane is outputted to the above printing mechanism for each primary color, thus performing color printing.

The above color printer is capable of performing the printing in colors other than the primary colors in addition to the primary color printing. That is to say, the color printer prints the colors exclusive of the primary colors by combining the plurality of primary colors. For example, green is printed with a combination of yellow and cyan.

Printing the green color entails writing the same source pattern on the Y-plane for yellow and the C-plane for cyan. For instance, as illustrated in FIG. 11, printing a letter "A" in green on a sheet PP involves sequential executions of processes of writing a pattern of the letter "A" on the yellow plane Y-plane and next writing the letter "A" pattern on the cyan plane C-plane.

Furthermore, as illustrated in FIGS. 11 and 11A, printing the above letter "A" in green needs to erase the letter "A" pattern out of the magenta plane M-plane if a background BG is written on the magenta plane M-plane.

Thus, when printing the secondary color other than the primary colors, the conventional writing process to the color bit map memory involves writing sequentially the source data on the combined color planes. Hence, there arises a necessity for a writing time corresponding to the number of planes for expressing the secondary colors, and this leads to such a problem that the high-speed writing can not be effected.

Further, if something is written on a plane of a primary color other than the combined primary colors, a problem is that a process of erasing source pattern thereof must be additionally done.

SUMMARY OF THE INVENTION

It is a primary object of the present invention to provide a color image processing apparatus for writing source data on a plurality of planes at a high speed.

It is another object of the present invention to provide a color image processing apparatus for writing the source data on the plurality of planes by one process.

It is still another object of the present invention to provide a color image processing apparatus for writing and erasing the data on and from the plurality of planes by one process.

To accomplish the above objects, a color image processing apparatus according to the present invention processes a color image and is used for a color image outputting mechanism for expressing secondary colors by superposing a plurality of primary colors. The color image processing apparatus comprises an address bus, a data bus and bit map memories. The bit map memories are provided corresponding to the plurality of primary colors and connected to the address bus. The bit map memories have a plurality of planes for storing bit map data for the respective primary colors. The color image processing apparatus also comprises a write control circuit, connected to the address bus and the data bus, for creating source data and an address having a control area for designating the plane on which the source data should be written and an address area for designating a memory address to which the source data should be written, and for outputting the created address and the source data to the address bus and the data bus. The same processing apparatus further comprises a data converting circuit, connected to the address bus and the data bus, for writing the source data on the bit map memory plane designated by data of the control area of the address, and a read circuit, connected to the address bus and the data bus, for sequentially reading the respective planes of the bit map memory and outputting the bit map data for respective primary colors to the color image outputting mechanism.

Provided is a control bit area capable of designating the plurality of planes on which the data should be written, and the write plane is selected from contents of the control bit area. Simultaneous writing on the plurality of planes can be therefore possible, and the writing operation can be speeded up.

Further, since the control bit area is provided within the write address, no particular command is needed. Hence, with only address setting, the simultaneous writing on the plurality of planes can be attained by one process.

Other features and advantages of the present invention will become readily apparent from the following description taken in conjunction with the accompanying drawings.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principle of the invention, in which:

FIG. 4 is an explanatory diagram showing an operation of control bits shown in FIG. 3;

FIG. 6 is an explanatory diagram illustrating a data converting circuit shown in FIG. 5;

FIGS. 11 and 11A are explanatory diagrams illustrating a prior art.

DETAILED DESCRIPTION OF THE PREFERRED EMBODIMENTS

Figure 1:
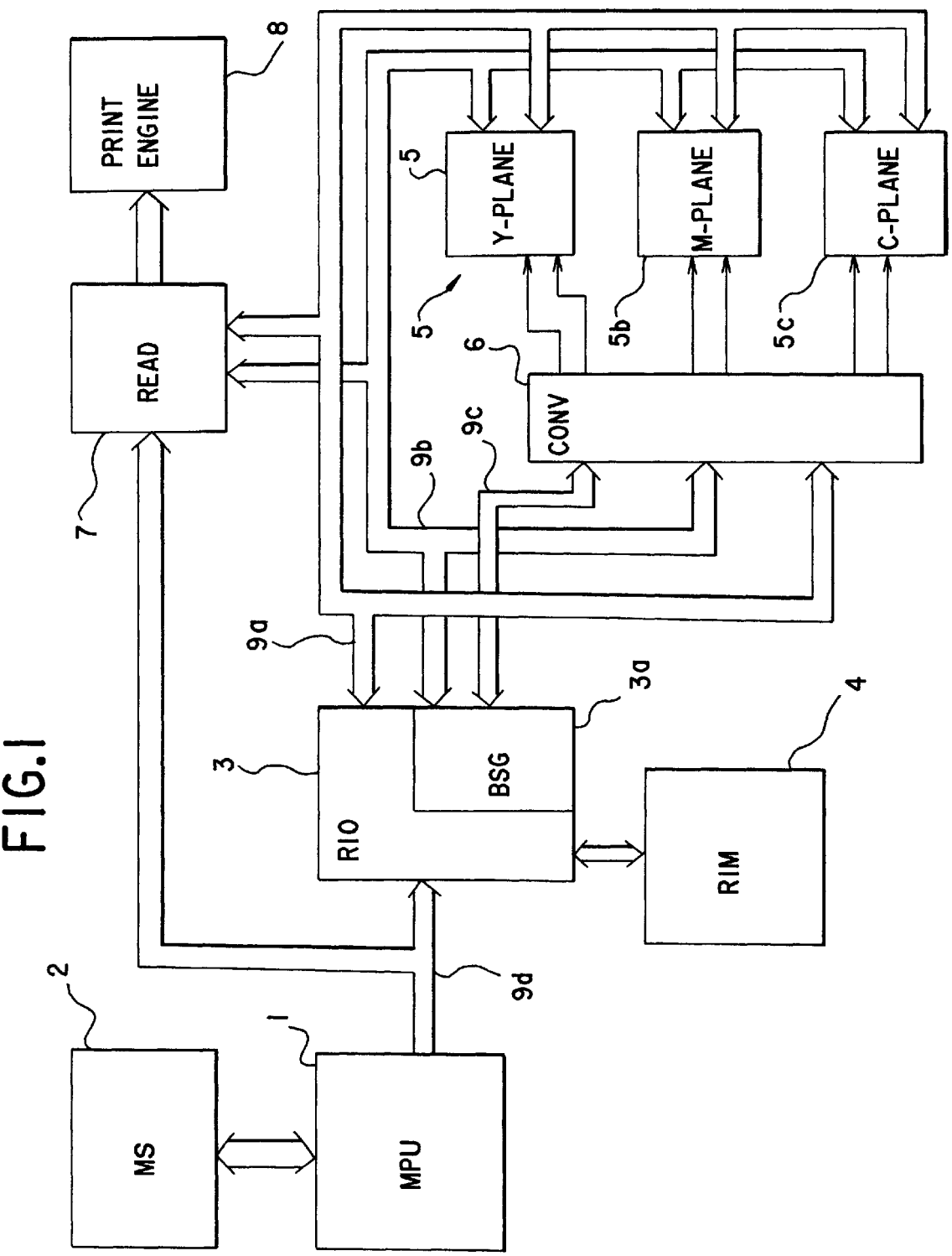
FIG. 1 is a block diagram showing one embodiment of the present invention.
Figure 2:
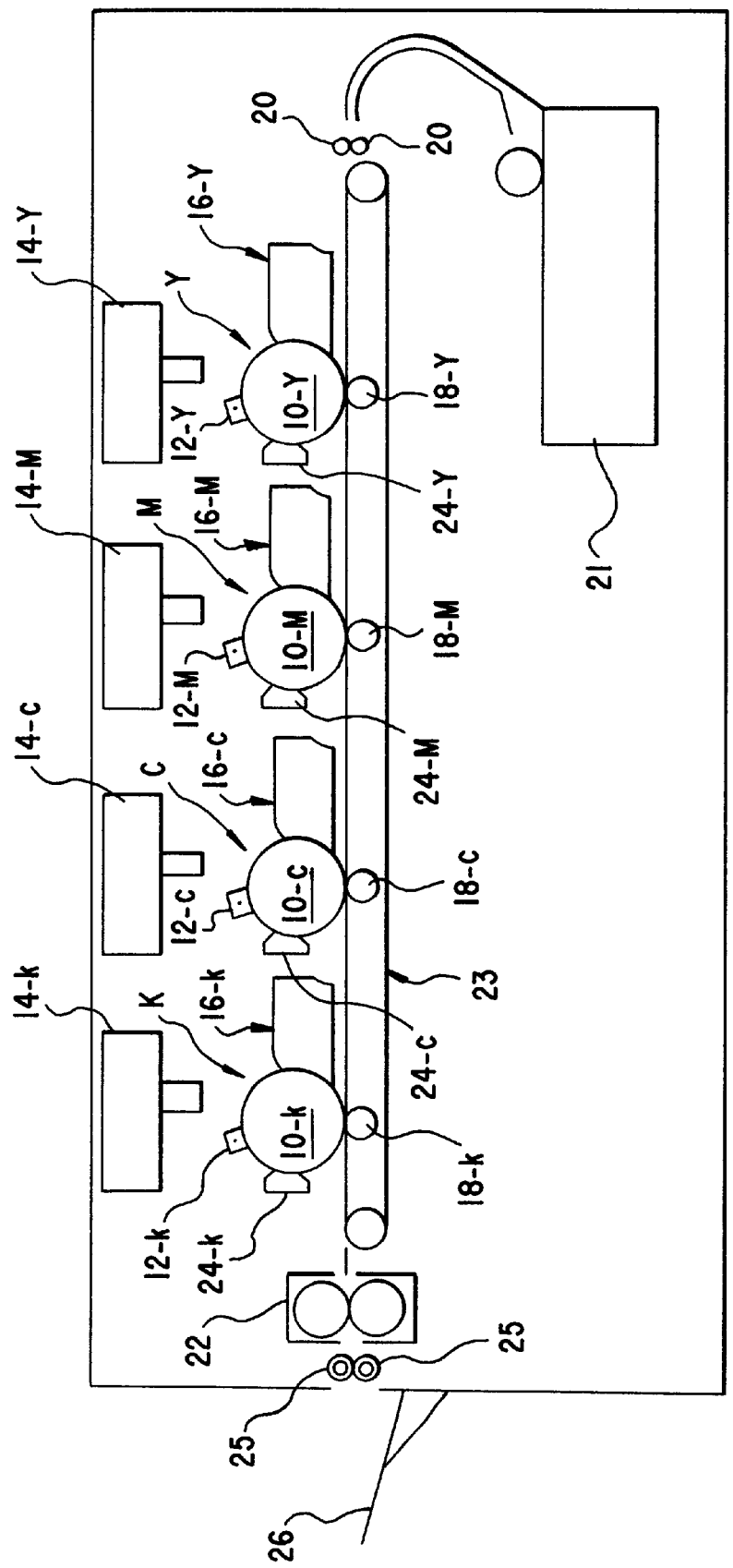
FIG. 2 is a diagram illustrating a print engine shown in FIG. 1.

FIG. 1 is a block diagram showing one embodiment of the present invention. FIG. 2 is a view illustrating a mechanism of a print engine.

As illustrated in FIG. 1, a main storage 2 stores color data. A microprocessor (control circuit) 1 creates, from the color data stored in the main storage 2, write addresses, and codes for indicating graphics and characters to be written, which will be mentioned later.

A raster image memory 4 stores image data. A raster image operator circuit 3 accesses a raster image memory 4 in accordance with the code given from the microprocessor 1. Then, the raster image operator circuit 3 obtains the image data corresponding to that code from the raster image memory 4. Further, the raster image operator circuit 3 creates the source data by performing boundary control such as transferring the image data.

The raster image operator circuit 3 further includes a bit select signal generating circuit 3a. The bit select signal generating circuit 3a, as will hereinafter be stated, bitwise generates a bit select signal for specifying whether the bit data is written or not.

A bit map memory 5 includes a plane 5a for storing an item of bit map data of yellow, a plane 5b for storing an item of bit map data of magenta, and a plane 5c for storing an item of bit map data of cyan.

A data converting circuit 6 converts, as will be mentioned later, the given addresses and data into write enable signals and write data of the respective planes 5a, 5b and 5c.

A read circuit 7 assigns the same address to each of the planes 5a, 5b and 5c. and reads the bit map data of the respective planes 5a, 5b and 5c. The print engine mechanism 8, as shown in FIG. 2, has printing mechanisms for the respective primary colors and black. Then, the print engine mechanism 8 performs color printing in accordance with the read bit map data.

Connected via an address bus 9a to the raster image operator circuit 3 are the respective planes 5a, 5b and 5c of the bit map memory 5, the data converting circuit 6 and the read circuit 7. This address bus 9a has a 32-bit width.

Connected via a data bus 9b to the bit select generating circuit 3a of the raster image operator circuit 3 are the respective planes 5a, 5b and 5c of the bit map memory 5, the data converting circuit 6, and the read circuit 7. This data bus 9b also has a 32-bit width.

The data converting circuit 6 is connected via a bit select bus 9c to the bit select generating circuit 3a of the raster image operator circuit 3. This bit select bus 9c also has a 32-bit width. Connected via an address/data bus 9d to the microprocessor 1 are the raster image operator circuit 3 and the read circuit 7. This address/data bus 9d also has a 32-bit width.

An operation of the circuit shown in FIG. 1 will be explained. The microprocessor 1 analyzes the color data given from the main storage 2, creates the write address and the write data, and gives an indication to the raster image operator circuit 3.

The raster image operator circuit 3 reads the source data from the raster image memory 4 and writes the source data to a designated address in the bit map memory 5 in accordance with a content of the indication given from the microprocessor 1. That is to say, the raster image operator circuit 3 outputs the above-mentioned write address and source data to the address bus 9a and the data bus 9b.

The data converting circuit 6 creates write control signals and the write data of the respective planes 5a, 5b and 5c in accordance with the addresses, the data, the bit select signals and read/write indicating signals which are given from the raster image operator circuit 3.

The data are written to predetermined addresses of the respective planes 5a, 5b and 5c on the basis of the write data, the write control signals and the addresses.

When the data for one page are written to the bit map memory 5, the read circuit 7 is actuated based on a read instruction given from the microprocessor 1. The read circuit 7 thereby reads and latches the data of the respective planes 5a, 5b and 5c of the bit map memory 5. The read circuit 7 creates an item of black color data from the latched data. Then, the read circuit 7 outputs the data of each primary color and the black color data to the print engine mechanism 8.

The print engine mechanism 8 performs the color printing by operating the respective primary color printing mechanism and the black color printing mechanism in accordance with the given respective primary color data and block color data.

The print engine mechanism 8 will be described with reference to FIG. 2. As illustrated in FIG. 2, image forming units Y, M and C for the respective primary colors such as yellow, magenta and cyan are provided in parallel.

In this embodiment, a black color image forming unit K is further provided. The black color can be also expressed by combining those primary colors. Black is, however, required to assume a sharp color as in the case of a document, etc.. Further, it is impossible to provide a sharp black color print depending on the combination of the primary colors. A black color image is therefore formed independently.

The respective color image forming units Y, M, C and K have the same construction. Specifically, the respective image forming units Y, M, C and K have individual photosensitive drums 10-Y, 10-M, 10-C and 10-K. These photosensitive drums 10-Y, 10-M, 10-C and 10-K are uniformly charged by respective electric chargers 12-Y, 12-M, 12-C and 12-K.

Then, on the respective photosensitive drums 10-Y, 10-M, 10-C and 10K, the images based on the bit map data of yellow, magenta, cyan and black are exposed by individual laser optical systems 14-Y, 14-M, 14-C and 14-K. Latent images of yellow, magenta, cyan and black are thereby formed on the respective photosensitive drums 10-Y, 10-M, 10-C and 10-K.

The latent images on the photosensitive drums 10-Y, 10-M, 10-C and 10-K are developed by respective developing units 16-Y, 16-M, 16-C and 16-K. The developing unit 16-Y supplies the photosensitive drum 10-Y with a yellow developer. Further, the developing unit 16-M supplies the photosensitive drum 10-M with a magenta developer. The developing unit 16-C supplies the photosensitive drum 10-C with a cyan developer, and the developing unit 16-K supplies the photosensitive drum 10-K with a black developer.

Developed images on the photosensitive drums 10-Y, 10-M, 10-C and 10-K are transferred on the sheet by respective transfer rollers 18-Y, 18-M, 18-C and 18-K. Then, the photosensitive drums 10-Y, 10-M, 10-C and 10-K are cleaned by cleaners 24-Y, 24-M, 24-C and 24-K.

On the other hand, the sheets are housed in a hopper 21. The sheets are taken out of the hopper 21 and subsequently fed by feed rollers 20. Thereafter, the sheets are sequentially fed through a feed belt 23 to transfer positions of the respective image forming units Y, M, C, and K. Then, the sheets, on which the developed images of the individual image forming units are transferred, are fed to a fixing unit 22, wherein the developed images on the sheets are fixed thereto.

Thereafter, the sheets are fed to a stacker 26 by discharge rollers 25 and then housed in the stacker 26.

The primary colors expressible in monochrome by the color printer apparatus are the three colors such as yellow, magenta and cyan. As stated above, however, the black-only image forming unit is separately provided for the sharp print in black. Accordingly, the eight colors including white can be expressed.

On the other hand, as illustrated in FIG. 1, the bit map memory 5 the planes 5a, 5b and 5c for the primary colors, yellow, magenta and cyan. Black is a mixed color of yellow, magenta and cyan, and hence the read circuit 7 creates the black color bit map data from the bit map data of the three planes.

Figure 3:
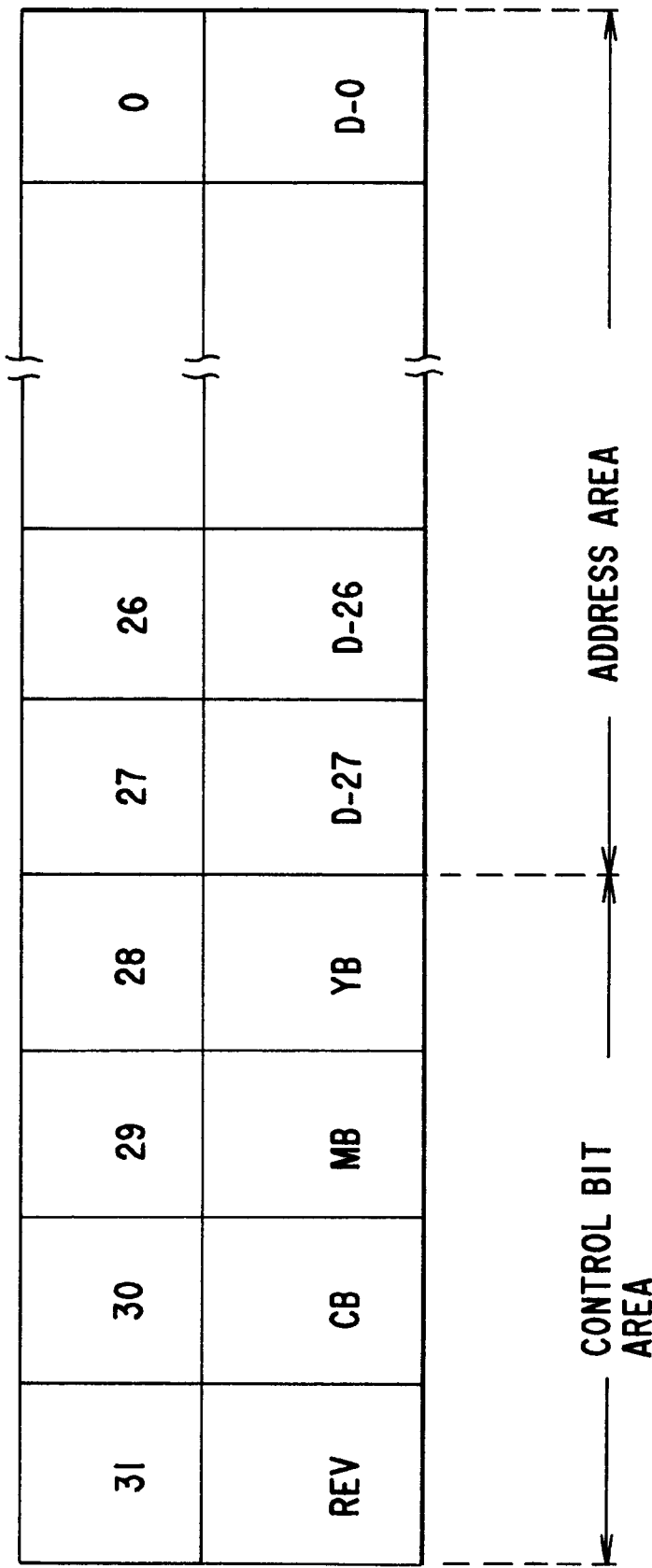
FIG. 3 is a diagram showing a structure of an address explained in FIG. 1.

FIG. 3 is a diagram showing a structure of the write addresses generated by the microprocessor 1 shown in FIG. 1. FIG. 4 is a diagram of assistance in explaining operations of control bits thereof.

As shown in FIG. 3, the 32-bit address is segmented into a control bit area consisting of high-order 4 bits and a memory address area consisting of low-order 28 bits. That is to say, the high-order 4 bits of the 32-bit address are assigned to the control bit area.

The highest-order 31st bit is defined as a reverse bit REV which will be mentioned later. The next 30th bit is a plane designating bit CB for designating the cyan color plane 5c as a writing target. The next 29th bit is a plane designating bit MB for designating the magenta color plane 5b as a writing target. The next 28th bit is a plane designating bit YB for designating the yellow color plane 5a as a writing target.

A significance of this control bit area will be elucidated with reference to FIG. 4. Note that FIG. 4 is shows Table for indicating expression colors corresponding to contents of the individual control bits and operating states of the respective planes.

As shown in FIG. 4, when the reverse bit is "0", the source data is written on the plane designated by a plane designating bit. For example, when desiring to print the yellow color, only a yellow plane designating bit YB is set to "1". The source data is thereby written on the yellow plane 5a.

Further, when expressing a color with the combination of the primary colors, a plurality of plane designating bits expressing that color is set to "1". For instance, when desiring to print the red color defined as a mixed color of magenta and yellow, magenta/yellow plane designating plane bits MB, YB are set to "1". The same source data are thereby written on the magenta/yellow planes 5b, 5a.

Accordingly, the number of the written plane can be set singular or plural depending on the control bit area plane designating bits for designating the written planes. Since this control bit area is a part of the address, the written plane can be designated by designating the address. It is therefore possible to simultaneously write the source data on the plurality of planes by one process.

On the other hand, when the reverse bit is "1", the source data is written on the plane designated by the plane designating bit. In addition, reverse data of the source data are written on the planes that are not designated by the plane designating bits. For instance, when desiring to write the source data on the yellow plane 5a but desiring to erase the source data from other planes 5b, 5c, the reverse bit is set to "1", and only the yellow plane designating bit YB is set to "1". The source data is thereby written on the yellow plane 5a, and the source data are erased from other planes 5b, 5c.

In this case also, when expressing a color with the combination of the primary colors, the plurality of plane designating bits expressing that color are set to "1". It is therefore possible to designate the planes from which the data are to be erased by one process.

The microprocessor 1 creates a control bit group of the control bit area of the address from Table of FIG. 4 in accordance with the color designated by the color data in the main storage 2 and then outputs the created control bit group.

Figure 5:
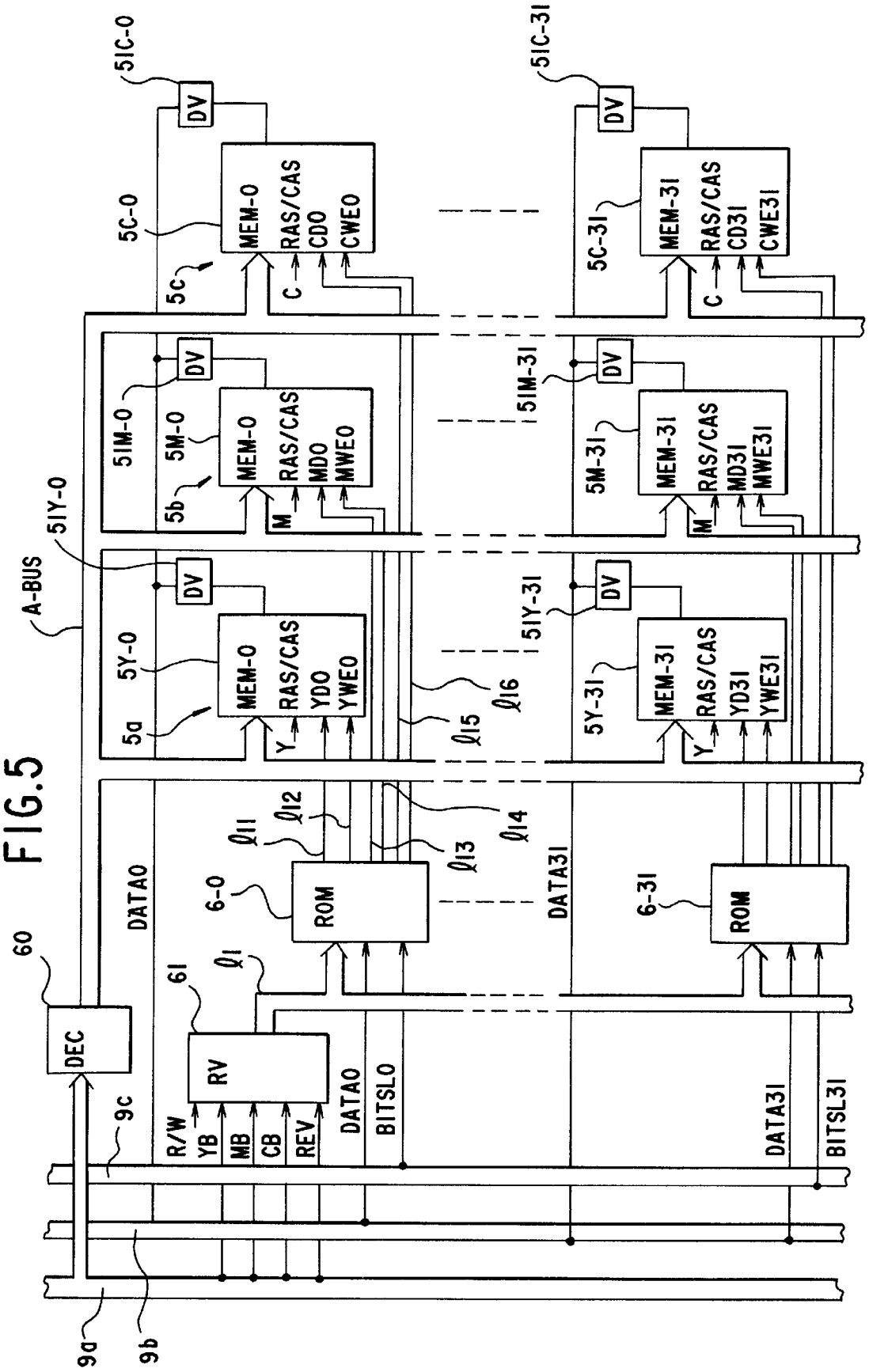
FIG. 5 is a block diagram illustrating a bit map memory shown in FIG. 1.

FIG. 5 is a block diagram showing the bit map memory shown in FIG. 1. FIG. 6 is an explanatory diagram of the data converting circuit shown in FIG. 5.

The yellow plane 5a has 32 pieces of memories 5Y-0 through 5Y-31 corresponding to the 32-bit data. Each of the memories 5Y-0 through 5Y-31 is constructed of a RAM (Random Access Memory) having a 1-bit data width and a 16 kilobit capacity.

Each of the memories 5Y-0 through 5Y-31 has a row address strobe/column address strobe input terminal RAS/CAS for reading, data input terminals YD0–YD31 for inputting the write data, and write enable terminals YWE0–YWE31.

Further, each of the memories 5Y-0 to 5Y-31 includes drivers 51Y-0 through 51Y-31 for driving the read data.

The magenta plane 5b has 32 pieces of memories 5M-0 through 5M-31 corresponding to the 32-bit data. Each of the memories 5M-0 through 5M-31 is constructed of the RAM having the 1-bit data width and the 16 kilobit capacity.

Each of the memories 5M-0 through 5M-31 has the row address strobe/column address strobe input terminal RAS/CAS for reading, data input terminals MD0–MD31 for inputting the write data, and write enable terminals MWE0–MWE31.

Further, each of the memories 5M-0 to 5M-31 includes drivers 51M-0 through 51M-31 for driving the read data.

The cyan plane 5c has 32 pieces of memories 5C-0 through 5C-31 corresponding to the 32-bit data. Each of the memories 5C-0 through 5C-31 is constructed of the RAM having the 1-bit data width and the 16 kilobit capacity.

Each of the memories 5C-0 through 5C-31 has the row address strobe/column address strobe input terminal RAS/CAS for reading, data input terminals CD0–CD31 for inputting the write data, and write enable terminals CWE0–CWE31.

Further, each of the memories 5C-0 to 5C-31 includes drivers 51C-0 through 51C-31 for driving the read data.

Inputted to a decoder 60 are bits of a 28-bit address area in the address of the address bus 9a. The decoder 60 decodes the bits of this address area and outputs the decoded bits to an internal bus A-BUS. The decoded address is supplied via this internal bus A-BUS to each of the memories 5Y-0 through 5C-31.

A receiver 61 receives and relays the read/write instruction R/W from the microprocessor 1, and four control bits REV, CB, MB, YB of the control bit area of the address from the address bus 9a.

The data converting circuit 6 includes 32 pieces of data conversion ROMs (Read Only Memories) 6-0 to 6-31 corresponding to the 32-bit data.

The first data conversion ROM 6-0 receives the read/write instruction R/W, the control bits REV, CB, MB, YB of the control bit area, first data DATA0 on the data bus 9b, and a first bit select signal BiTSL0 on the bit select bus 9c.

Then, the first data conversion ROM 6-0, when the read/write instruction is a write instruction (R/W=1), outputs the write data YD0 and the write enable signal YWE0 of the yellow color memory 5Y-0, the write data MD0 and the write enable signal MWE0 of the magenta color memory 5M-0, and the write data CD0 and the write enable signals CWE0 of the cyan color memory 5C-0, which correspond to the data of the control bits.

More specifically, the first data conversion ROM 6-0, when the write instruction is given, converts the first data DATA0, the control bits REV, CB, MB, YB and the bit select signal BiTSL0 into the write data YD0, the write enable signal YWE0, the write data MD0, the write enable signal MWE0, the write data CD0 and the write enable signal CWE0.

FIG. 6 shows Table for conversion of the first data conversion ROM 6-0. Note that FIG. 6 shows corresponding Table for converting the read/write instruction, the select bit BiTSL0, the data DATA0 and the control bits REV, CB, MB, YB into write data CD0, MD0, YD0 of the respective colors and write enable signals CWE0, MWE0, YWE0 of the respective colors.

Referring to FIG. 6, when the first bit select signal BiTSL0 is "0", all the write enable signals CWE0, MWE0, YWE0 are "0". Even if the data takes any value, no writing process is executed.

Further, when the first bit select signal BiTSL is "1" and the data DATA0 is "0", the write instruction is changed to an instruction which follows in accordance with the control bits REV, CB, MB, YB.

When the reverse bit REV is "0", the reversion is not indicated, and hence the write enable signals CWE0, MWE0, YWE0 for the planes designated by the plane designating bits CB, MB, YB become "1". Further, the write data CD0, MD0, YD0 for the planes designated by the plane designating bits CB, MB, YB become "0" as in the case of the data DATA0.

Accordingly, the data "0" is written to the memories 5Y-0, 5M-0, 5C-0 wherein the write enable signals CWE0, MWE0, YWE0 are "1".

In this case, when the plurality of planes are designated by the plane designating bits CB, MB, YB, the data are written on all the designated planes at one time.

On the other hand, when the reverse bit REV is "1", since the reversion is indicated, the write enable signals CWE0, MWE0, YWE0 for the planes designated by the plane designating bits CB, MB, YB become "1", Further, the write enable signals CWE0, MWE0, YWE0 for the planes that are not designated by the plane designating bits CB, MB, YB also become "1". Namely, all the plane write enable signals CWE0, MWE0, YWE0 become "1".

With this operation, the write data CD0, MD0, YD0 for the planes designated by the plane designating bits CB, MB, YB become "0" as in the case of the DATA0. Then, the write data CD0, MD0, YD0 for the planes that are not designated by the plane designating bits CB, MB, YB become "1" defined as the reverse data of the data DATA0.

Hence, the data "0" is written to the memories 5Y-0, 5M-0, 5C-0 for the planes designated by the plane designating bits CB, MB, YB. On the other hand, the data "1" is written to the memories 5Y-0, 5M-0, 5C-0 for the planes that are not designated by the plane designating bits CB, MB, YB.

In this case, when the plurality of planes are designated by the plane designating bits CB, MB, YB, the same data as the data DATA0 is written on all the designated planes at one time. With this operation, the reverse data of the data DATA0 is written by the reverse bit REV on the planes that are not designated by the plane designating bits CB, MB, YB.

Next, when the first bit select signal BiTSL is "1" and the data DATA0 is "1", the write instruction is changed to an instruction which follows in accordance with the control bits REV, CB, MB, YB.

When the reverse bit REV is "0", the reversion is not indicated, and hence the write enable signals CWE0, MWE0, YWE0 for the planes designated by the plane designating bits CB, MB, YB become "1". Further, the write data CD0, MD0, YD0 for the planes designated by the plane designating bits CB, MB, YB become "1" as in the case of the data DATA0.

Accordingly, the data "1" is written to the memories 5Y-0, 5M-0, 5C-0 wherein the write enable signals CWE0, MWE0, YWE0 are "1".

In this case, when the plurality of planes are designated by the plane designating bits CB, MB, YB, the data are written on all the designated planes at one time.

when the reverse bit REV is "1", since the reversion is indicated, the write enable signals CWE0, MWE0, YWE0 for the planes designated by the plane designating bits CB, MB, YB become "1", Further, the write enable signals CWE0, MWE0, YWE0 for the planes that are not designated by the plane designating bits CB, MB, YB also become "1". Namely, all the write enable signals CWE0, MWE0, YWE0 become "1".

With this operation, the write data CD0, MD0, YD0 for the planes designated by the plane designating bits CB, MB, YB become "1" as in the case of the DATA0. Then, the write data CD0, MD0, YD0 for the planes that are not designated by the plane designating bits CB, MB, YB become "0" defined as the reverse data of the data DATA0.

Hence, the data "1" is written to the memories 5Y-0, 5M-0, 5C-0 for the planes designated by the plane designating bits CB, MB, YB. On the other hand, the data "0" is written to the memories 5Y-0, 5M-0, 5C-0 for the planes that are not designated by the plane designating bits CB, MB, YB.

In this case, when the plurality of planes are designated by the plane designating bits CB, MB, YB, the same data as the data DATA0 is written on all the designated planes at one time. With this operation, the reverse data of the data DATA0 is written by the reverse bit REV on the planes that are not designated by the plane designating bits CB, MB, YB.

Note that the write data YD0 and the write enable signal YWE0 in the yellow color memory are inputted via lines $1_{11}$, $1_{12}$ to the memory 5Y-0. Further, the write data MD0 and the write enable signal MWE0 in the magenta color memory are inputted via lines $1_{13}$, $1_{14}$ to the memory 5M-0. Furthermore, the write data CD0 and the write enable signal CWE0 in the cyan color memory are inputted via lines $1_{15}$, $1_{16}$ to the memory 5C-0.

Hereinafter, similarly, the 32nd data conversion ROM 6-31, when the write instruction is given, converts the 32nd data DATA31 into the write data YD31, the write enable signal YWE31, the write data MD31, the write enable signal MWE31, the write data CD31 and the write enable signal CWE31 in accordance with the control bits REV, CB, MB, YB and the bit select signal BiTSL31.

Then, the 32nd memories 5Y-31, 5M-31, 5C-31 are thereby write-controlled.

Thus, the 32-bit data are written on the planes designated by the plane designating bits CB, MB, YB of the control bit area of the address. Accordingly, when the plurality of planes are designated by the plane designating bits CB, MB, YB, the same data is written on the plurality of planes at one time. Therefore, a high-speed writing process can be performed.

Further, if the reverse bit of the control bit area is set to "1", the reverse data of the write data are written on the planes that are not designated by the plane designating bits CB, MB, YB. The data on the specified planes can be thereby erased simultaneously with the writing process.

Provided further is the data converting circuit 6 which converts the source data, the control bits REV, CB, MB, YB and the bit select signal into the write data and the write enable signals of the respective memories. Therefore, fast accessing can be attained.

Besides, the data converting circuit 6 is constructed of the ROM and therefore actualized with simple circuitry.

Figure 7:
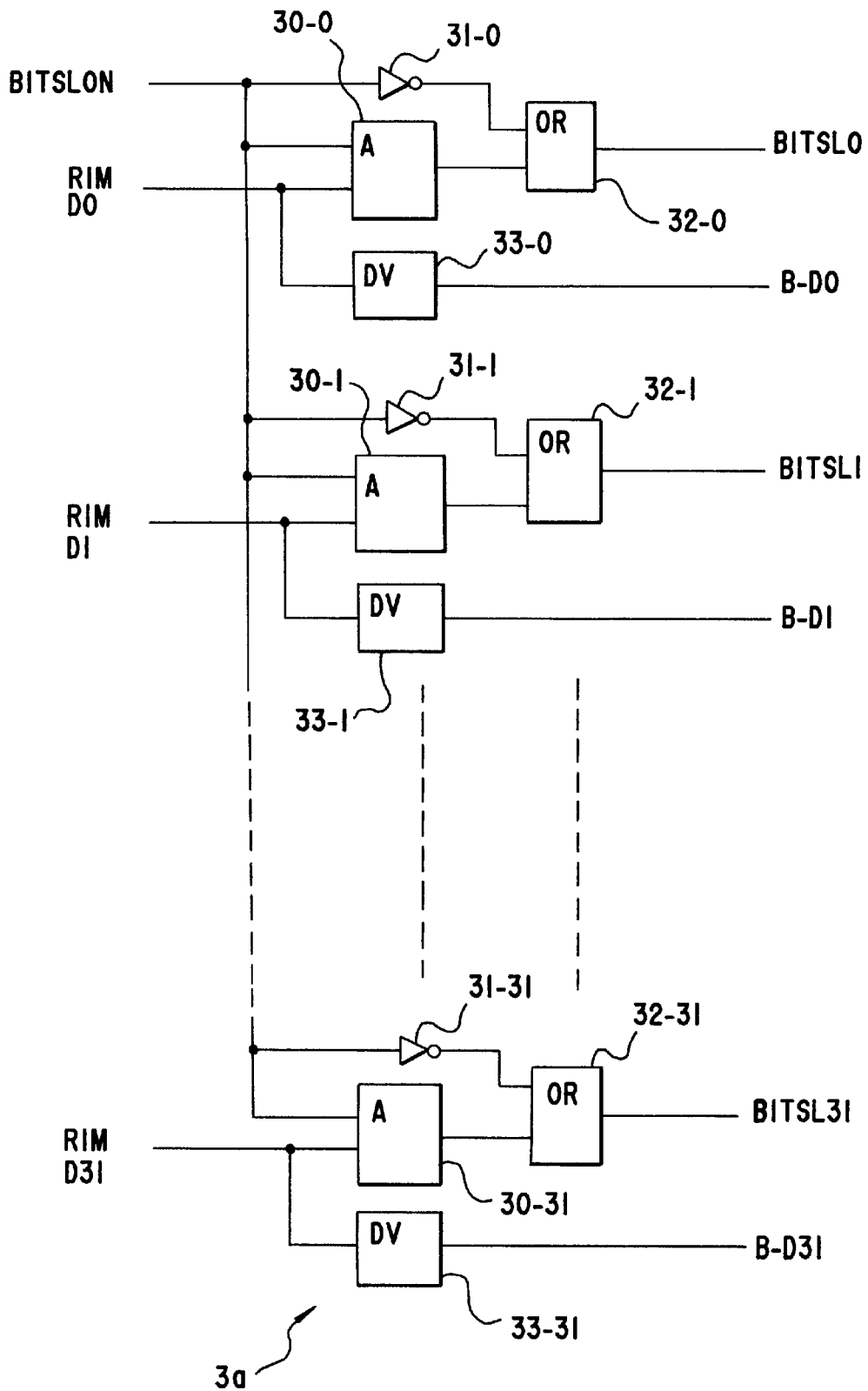
FIG. 7 is a block diagram illustrating a bit select signal generating circuit shown in FIG. 1.
Figure 8A:
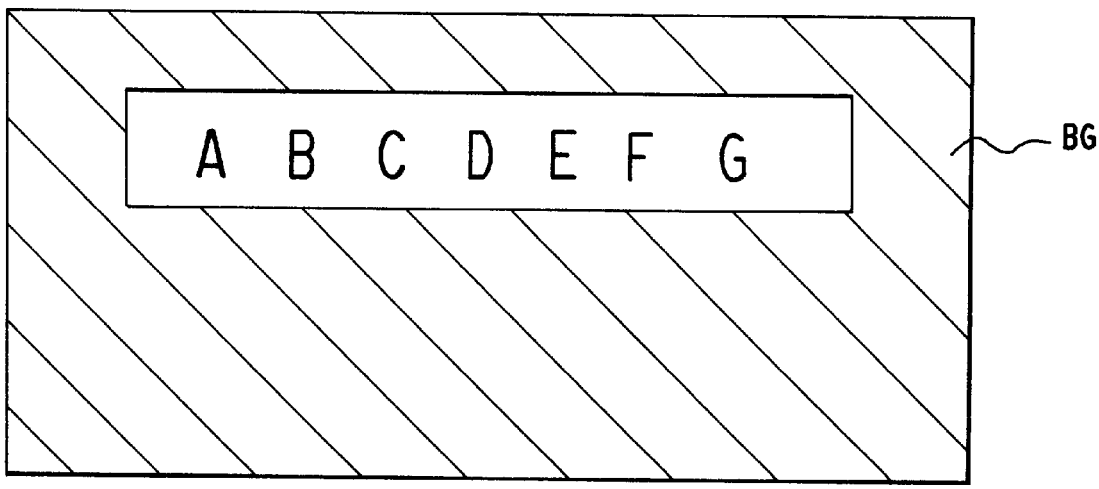
FIGS. 8A and 8B are explanatory diagrams each showing a bit select signal shown in FIG. 7.
Figure 8B:
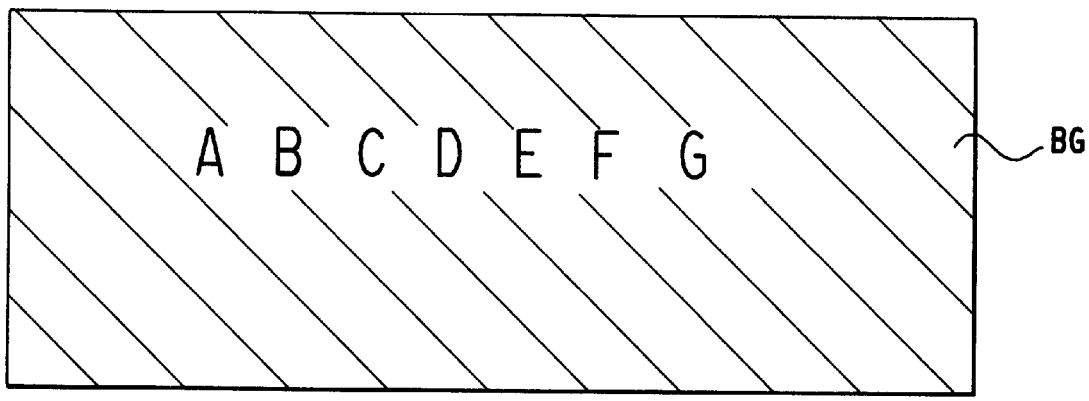

Now, the above-mentioned bit select signal on the bit select bus 9c will be explained. FIG. 7 is a block diagram showing the bit select signal generating circuit 3a. FIGS. 8A and 8B are explanatory diagrams of the bit select signal.

A bit select-OFF mode is a mode of overwriting the source data itself on the memory. For example, as shown in FIG. 8A, this mode is used when pieces of data of letters "A", "B", "C", . . . are overwritten on the background BG. Accordingly, the data "0" of the source data is written on the area excluding the letter pattern area (of the data "1").

A bit select-ON mode is a mode of writing only the area of the source data "1". For instance, as shown in FIG. 8B, this mode is employed when only the letter pattern area (of the data "1") is written on the background BG. That is to say, a read modified write process is executed at one time. Hence, no data is written on the area exclusive of the letter pattern area.

As illustrated in FIG. 7, a bit select mode signal BiTSL-ON is generated by the microprocessor 1. The mode signals BiTSL-ON are reversed by 32 pieces of reversing circuits 31-0 to 31—31. Logical products of pieces of source data RIMD0–RIMD31 and the mode signals BiTSL-ON are obtained by 32-pieces of AND gates 30-0 to 30-31.

Thirty-two pieces of OR gates 32-0 to 32-31 obtain OR of outputs of the reversing circuits 31-0 to 31—31 and output of the AND gates 30-0 to 30-31. The outputs of the OR gates 32-0 to 32-31 are bit select signals BiTSL0–BiTSL31 on the bit select bus 9c.

Thirty-two pieces of driver circuits 33-0 to 33-31 drive pieces of source data RIMD0–RIMD31 and transmit the source data to the data bus 9b. The data on the data bus 9b are defined as data B-D0 to B-D31.

Operations of these circuits will be explained. In the bit select-OFF mode, the mode signal is "0", and hence the bit select signals BiTSL0–BiTSL31 of "1" are outputted through the reversing circuits 31-0 to 31—31 and the OR gates 32-0 to 32-31.

Accordingly, as explained with reference to FIG. 6, the data "1" or "1" is written to each of the memories 5a, 5b, 5c in accordance with the control bits REV, CB, MB, YB. As illustrated in FIG. 8A, the source data can be thereby written on the background.

On the other hand, in the bit select-ON mode, the mode signal is "1". For this reason, only when the source data RIMD0–R1MD31 are "1", the bit select signals BiTSL0–BiTSL31 of "1" are outputted from the AND gates 30-0 to 30-31. Then, when the source data RIMD0–RIMD31 are "0", the bit select signals BiTSL0–BiTSL31 of "0" are outputted.

Accordingly, when the source data RIMD0–RIMD31 are "1", the data "1" is written based on the control bits REV, CB, MB, YB. On the other hand, when the source data RIMD0–RIMD31 are "0", no writing process is executed. As shown in FIG. 8B, it is thereby possible to designate the writing only the pattern area on the background. Besides, this writing can be performed by the same process as the above writing.

Thus, the source data overwriting operation or the read modified write operation can be executed by the designation of the bit select signal.

Figure 9:
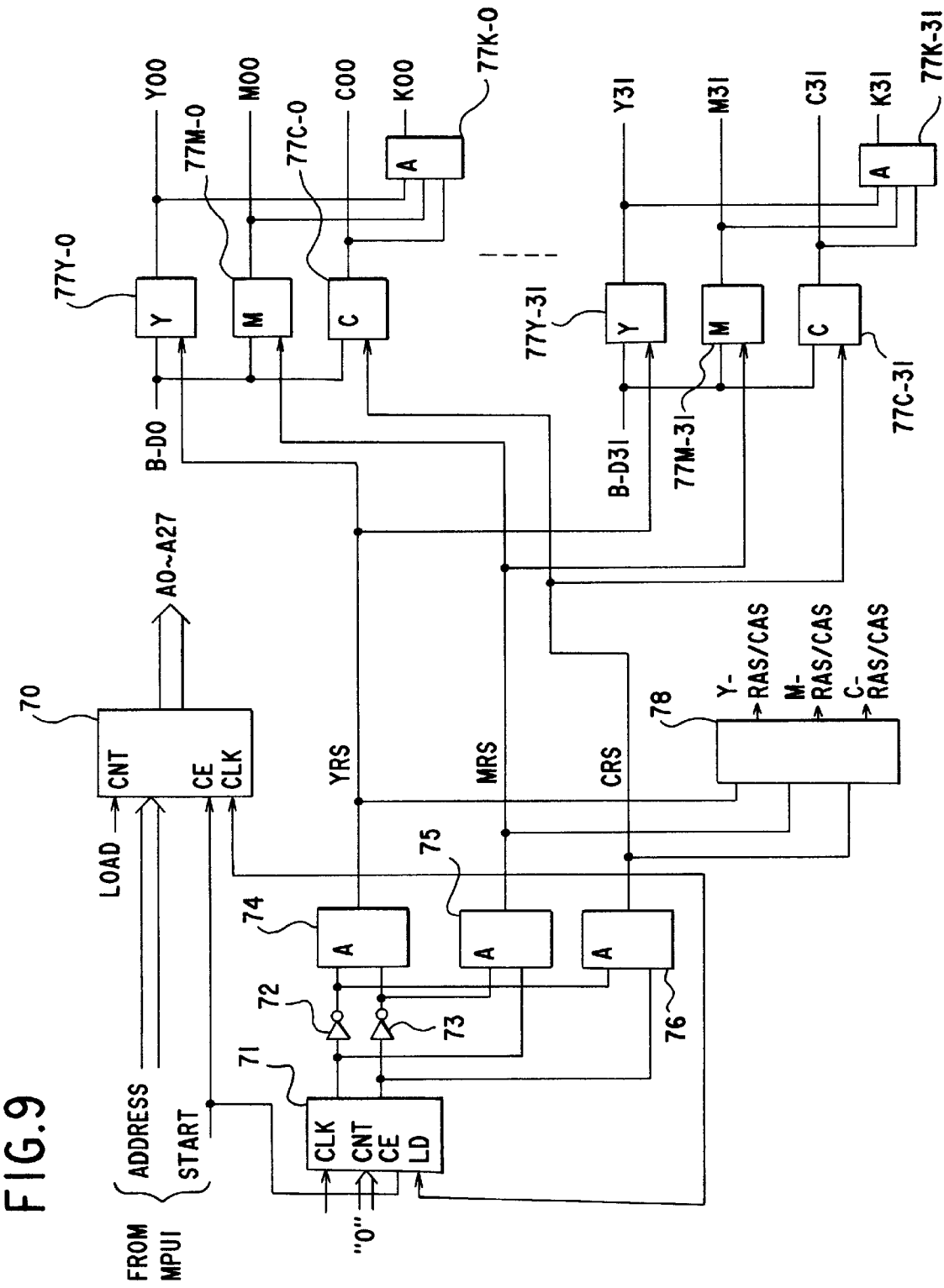
FIG. 9 is a block diagram illustrating a read circuit shown in FIG. 1.
Figure 10:
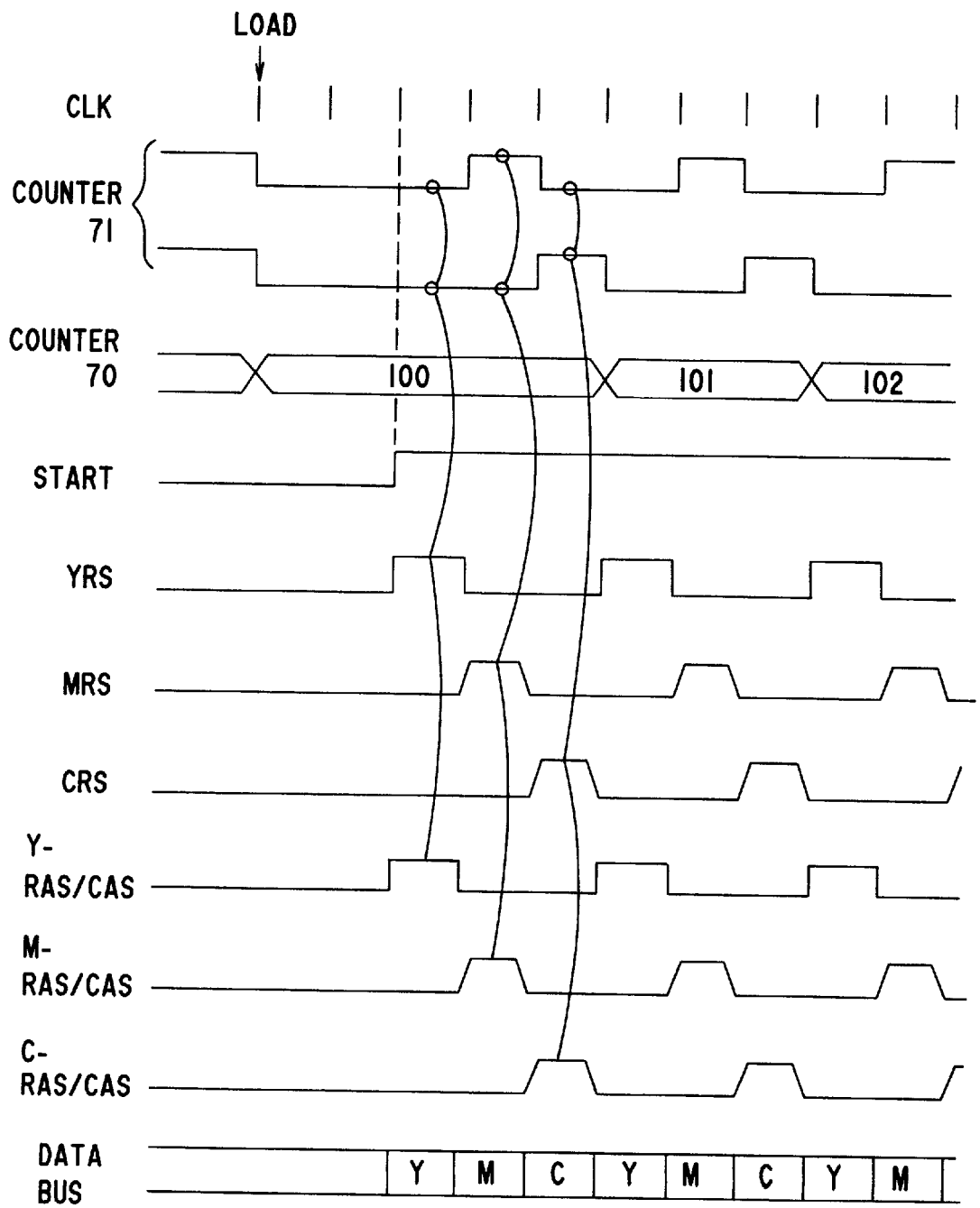
FIG. 10 is a time chart of the read circuit shown in FIG. 9.

FIG. 9 is a block diagram of the read circuit shown in FIG. 1. FIG. 10 is a time chart for the read circuit.

As shown in FIG. 9, the microprocessor 1 loads a start-of-read address into a read address counter 70. Then, the counter 70 is brought into a count enable status by a start signal START transmitted from the microprocessor 1. The counter 70 thereby counts read latch signal CRS from latch signal generating circuits 71–76 which will be mentioned later. The counter 70 then transmits the 28-bit read address to the address bus 9a.

The latch signal generating circuits 71–76 have a 2-bit counter 71. The counter 71 assumes a count enable status by the start signal START from the microprocessor 1. Then, the counter 71, into which "0" is loaded with the latch signal CRS, counts clocks CLK.

A first reversion circuit 72 reverses a first-digit output of the counter 71. The second reversing circuit 73 reverses a second digit output of the counter 71. The first AND gate 74 takes AND of outputs of the two reversing circuits 72, 73. A latch signal YRS for yellow is thereby outputted from the first AND gate 74.

A second AND gate 75 takes AND of the first digit output of the counter 71 and the output of the second reversing circuit 73. A latch signal MRS for magenta is thereby outputted from the second AND gate 75.

A third AND gate 76 takes AND of the second digit output of the counter 71 and the output of the first reversing circuit 72. A latch signal CRS for cyan is thereby outputted from the third AND gate 76.

Latch circuit units 77Y-0 to 77K-31 are provided for 32 bits defined as a data width. The first latch circuit unit corresponding to the first bit data includes a first latch circuit 77Y-0 for latching a piece of 1st-bit data B-D0 on the data bus 9b by the latch signal YRS, and a first latch circuit 77M-0 for latching 1st-bit data B-D0 on the data bus 9b by the latch signal MRS. The first latch circuit unit also includes a first latch circuit 77C-0 for latching 1st-bit data B-D0 on the data bus 9b by the latch signal CRS, and an AND gate 77K-0 for taking AND of outputs of the three latch circuits 77Y-0, 77M-0, 77C-0. A piece of data K00 for black is generated based on an output of this AND gate 77K-0.

These latch circuit units are provided for the number of bits of the data bus 9b. A 32nd latch circuit unit corresponding to 32nd-bit data includes a first latch circuit 77Y-31 for latching a piece of 32nd-bit data B-D31 on the data bus 9b by the latch signal YRS, and a first latch circuit 77M-31 for latching 32nd-bit data B-D31 on the data bus 9b by the latch signal MRS. The 32nd latch circuit unit also includes a first latch circuit 77C-31 for latching 32nd-bit data B-D31 on the data bus 9b by the latch signal CRS, and an AND gate 77K-31 for taking AND of outputs of the three latch circuits 77Y-31, 77M-31, 77C-31. A piece of data K31 for black is generated based on an output of this AND gate 77K-31.

Synchronizing with the respective latch signals Y-RS, MRS and CRS, a RAS/CAS signal generating circuit 78 generates the row address strobe/column address strobe Y-RAS/CAS of the yellow color memory 5a, the row address strobe/column address strobe M-RAS/CAS of the magenta color memory 5b, and the row address strobe/column address strobe C-RAS/CAS of the cyan color memory 5c, which are explained with reference to FIG. 5.

Operations of the circuits shown in FIG. 9 will be explained with reference to FIG. 10. The microprocessor 1 starts the reading from the bit map memory 5. At first, the microprocessor 1 outputs the start-of-read address and the load signal to the counter 70. The start-of-read address is thereby loaded into the counter 70.

Next, the microprocessor 1 outputs the start-of-read signal START to the counters 70 and 71. The counter 71 thereby counts the clocks CLK. With this counting operation, the latch signals YRS, MRS, CRS for the respective colors are sequentially outputted from the first, second and third AND gates 74, 75, 76.

Synchronizing with the latch signals YRS, MRS and CRS, the RAS/CAS signal generating circuit 78 generates the row address strobe/column address strobe Y-RAS/CAS for yellow, the row address strobe/column address strobe M-RAS/CAS for magenta, and the row address strobe/column address strobe C-RAS/CAS for cyan.

The respective latch circuit units make the latch circuits 77Y-0 through 77C-31 thereof latch the read data outputted to the data bus 9b by the latch signals YRS, MRS, CRS. The yellow color latch circuits 77Y-0 through 77Y-31 thereby latch the data of the yellow color memory 5a. Further, the magenta color latch circuits 77M-0 through 77M-31 thereby latch the data of the magenta color memory 5b, and the cyan color latch circuits 77C-0 through 77C-31 thereby latch the data of the cyan color memory 5c.

Thus, after three reading operations in one address have been performed, the read address counter 70 counts the latch signals CRS, and generates the next read address. Accordingly, the reading operation for the next address is carried out in the same way.

Herein, black is a mixed color of yellow and magenta. Hence, when taking AND of the yellow color latch data, the magenta color latch data and the cyan color latch data, the black color data is obtained. For this purpose, the AND gates 77K-0 to 77K-31 are provided.

Thus, even if the black color bit map plane is not provided, the black color data can be generated. The capacity of the bit map memory can be therefore reduced.

Note that when the black color data is "1", the yellow color latch data, the magenta color latch data and the cyan color latch data are all "1", and there is a possibility in which 4-color printing might be effected. For preventing this, it is desirable to provide an inhibiting circuit for inhibiting outputs of the yellow color latch data, the magenta color latch data and the cyan color latch data when the outputs of the AND gates 77K-0 to 77K-31 are "1".

For example, there may be provided the reversing circuits for reversing the outputs of the respective AND gates 77K-0 to 77K-31, and three AND gates for taking AND of the outputs of the reversing circuits and the latch circuits for above-mentioned three colors.

In addition to the embodiments discussed above, the present invention may take the following modifications.

Although explained in the example where the bit map planes for the primary colors are provided, a black color bit map plane may be separately provided. Further, reversely, the black color printing mechanism may be eliminated.

The electronic photographic printing mechanism has been exemplified by way of the color printer. The present invention is, however, applicable to other color printing mechanisms such as an ink jet printing mechanism and a thermal transfer printing mechanism. Though described by way of the color printer, the present invention is applicable to a color display. In this case, the primary colors are red, green and blue.

The present invention has been discussed so far by way of the embodiments. A variety of modification are, however, possible within the range of the gist of the present invention but are not excluded from the scope of the present invention.

As discussed above, according to the present invention, first, the control bit area for designating the write plane is provided for making possible the simultaneous writing on the plurality of planes. With this arrangement, the write plane can be selected from the contents of the control bit area, and, therefore, the simultaneous writing on the plurality of planes can be performed, thereby speeding up the writing operation.

Second, the control bit area is set in the write address, and hence no command is particularly required. The simultaneous writing on the plurality of planes can be therefore effected by one process.

What is claimed is:

1. A color image processing apparatus, for processing a color image, used for a color image outputting mechanism for expressing secondary colors by superposing a plurality of primary colors, said apparatus comprising:

an address bus, a data bus, bit map memory connected to said address bus, and having a plurality of planes, provided corresponding to the plurality of primary colors, for storing bit map data for the respective primary colors;

a write control circuit, connected to said address bus and said data bus, for creating source data and an address having a control area for designating said plane on which the source data should be written and an address area for designating a memory address to which the source data should be written, and for outputting the created address and the source data to said address bus and said data bus;

a data converting circuit, connected to said address bus and said data bus, for writing the source data on said plane of said bit map memory designated by data of the control area of the address; and a read circuit, connected to said address bus and said data bus, for sequentially reading said respective planes of said bit map memory and outputting the bit map data for respective primary colors to said color image outputting mechanism.

2. The color image processing apparatus according to claim 1, wherein said data converting circuit writes the source data on said plurality of designated planes when said plurality of planes are designated in the control area.

3. The color image processing apparatus according to claim 1, wherein said data converting circuit generates a write selecting signal and write data for said plane designated by the data of the control area from the source data and the data of the control area of said address.

4. The color image processing apparatus according to claim 3, wherein said data converting circuit is constructed of a memory, accessed by the source data and the data of the control area of the address, for generating the write selecting signal and the write data for said plane designated by the data of the control area.

5. The color image processing apparatus according to claim 1, further comprising:

a bit select bus, connected to said write control circuit and said data converting circuit, for designating whether or not the source data should be written bitwise of the source data, wherein said write control circuit generates the bit select signal for indicating whether or not the source data should be written, and said data converting circuit generates the write selecting signal and the write data for said each plane of said bit map memory from the data of the control area of the address, the source data and the bit select signal on said bit select bus.

6. The color image processing apparatus according to claim 1, wherein said read circuit includes a circuit for creating bit map data of colors excluding the primary colors from the bit map data of the respective primary colors.

7. The color image processing apparatus according to claim 1, wherein said write control circuit creates data of the control area that consist of reverse data for indicating the reversed data should be written and designating data for designating said plane on which the data should be written, and said data converting circuit generates the reversed data of the source data and the write selecting signal in said planes that are not designated by the designating data.

8. The color image processing apparatus according to claim 1, wherein said write control circuit creates the address including the data for designating said plane for every said plane.

9. The color image processing apparatus according to claim 1, wherein said color image outputting mechanism is constructed of a printer, connected to said read circuit, for printing the primary color bit map data.

* * * * *